Jan. 8, 1935.  P. G. NELSON  1,987,348
SHARPENER
Filed April 28, 1934   2 Sheets-Sheet 1
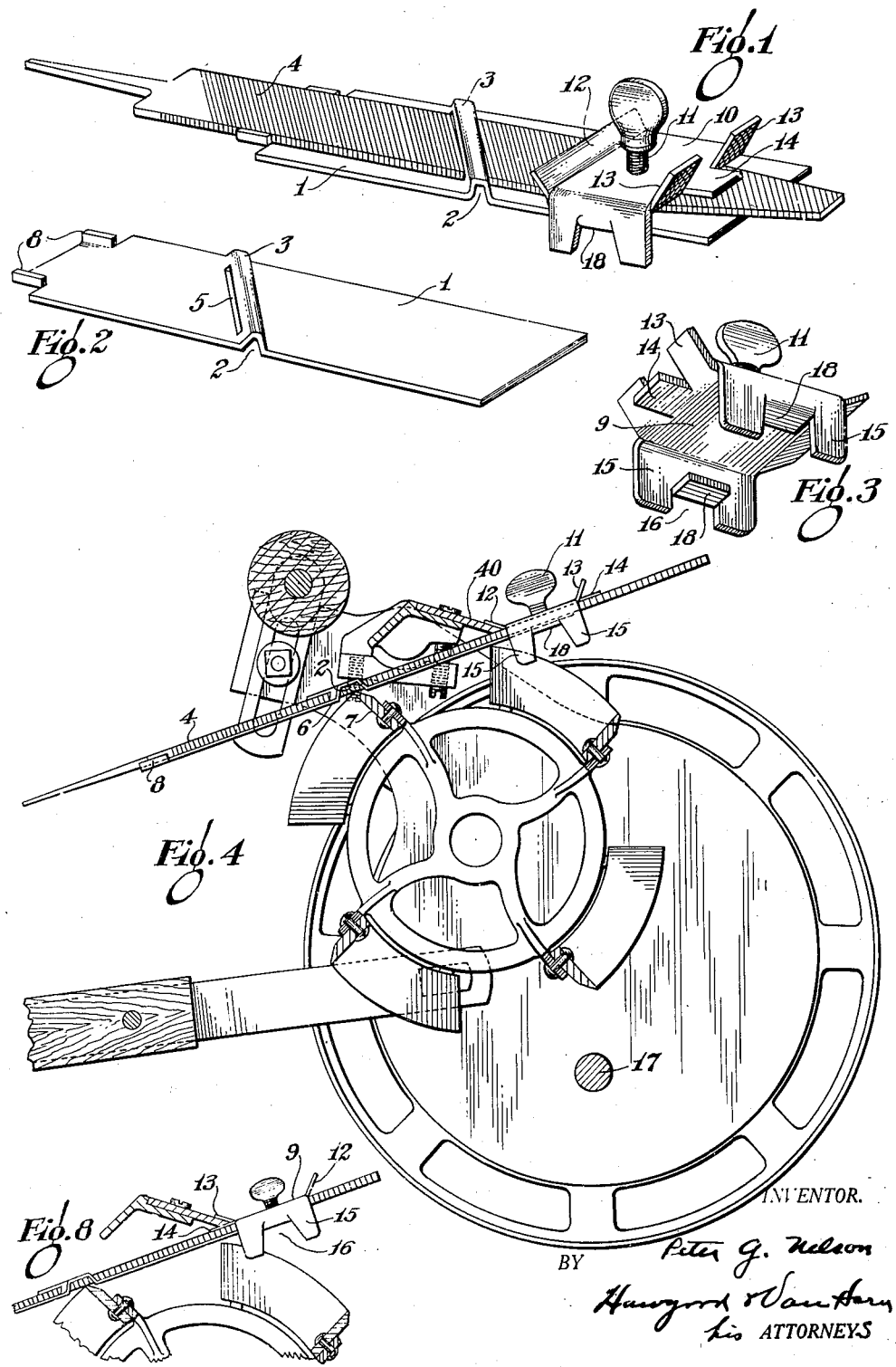

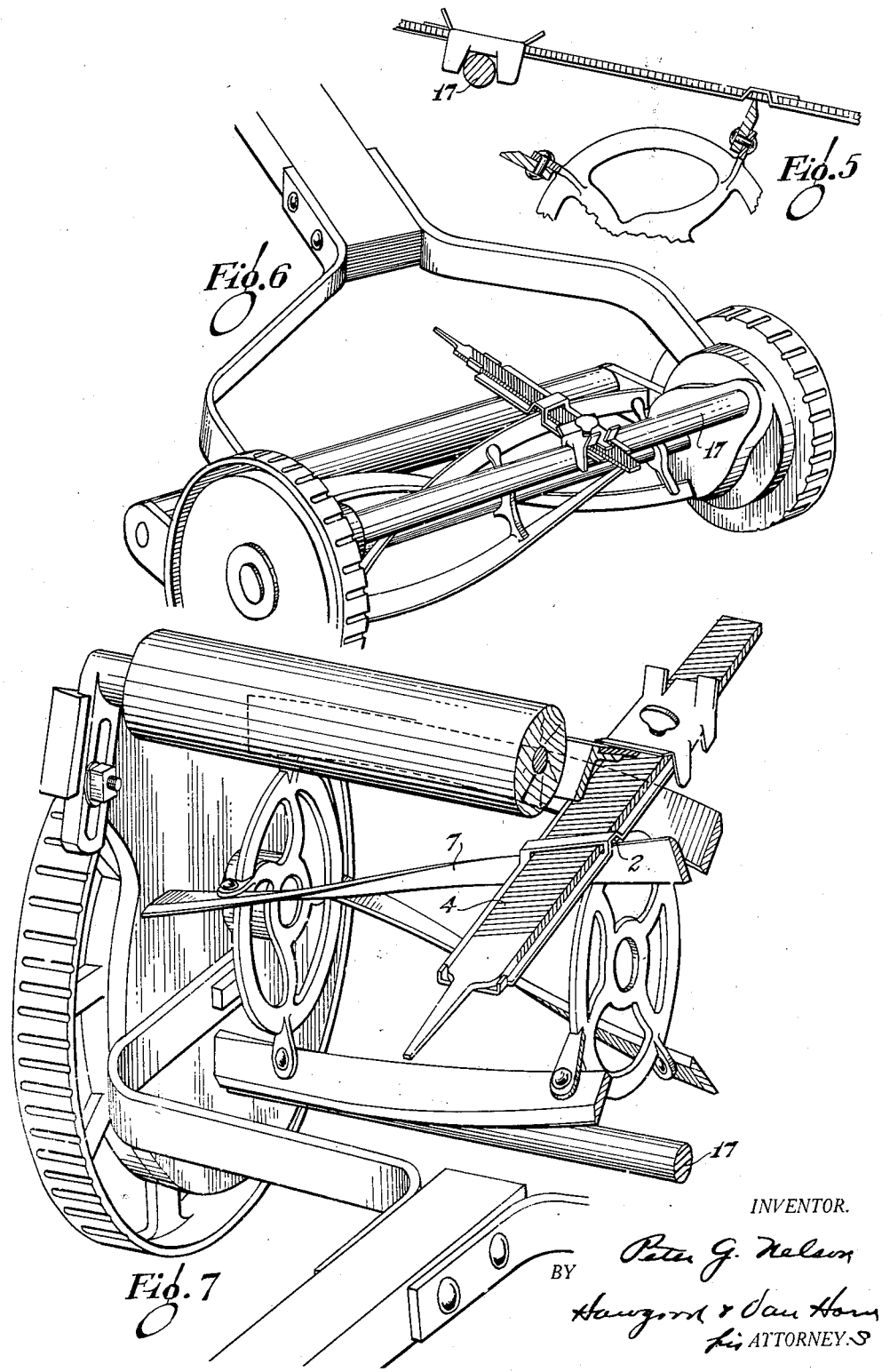

Patented Jan. 8, 1935

1,987,348

UNITED STATES PATENT OFFICE 1,987,348

SHARPENER

Peter G. Nelson, Willoughby, Ohio

Application April 28, 1934, Serial No. 722,927

2 Claims. (Cl. 76—82.1)

My invention is an improvement in blade sharpeners and relates more particularly to devices for attachment to lawn mowers, or the like, for sharpening the blades thereof.

It is one of the objects of this invention to provide a device which can readily be applied or attached to lawn mowers of different makes and sizes and adjusted in proper position to sharpen the blades and cutter bar thereof, either independently or simultaneously.

It is a further object of the invention to provide a holder for a common file or similar instrument, wherein the file may be adjusted longitudinally with respect to the holder and clamped or fixed in place upon the holder.

A further object consists in providing a removable and reversible blade guide for the holder, which in one position with respect to the holder serves as a guide or rest for the fixed substantially straight blade of the mower, and which when adjusted to a reverse position serves to shield said blade from contact with the file.

A still further object is to provide a combined device of the class described which can be quickly converted for sharpening both the revolving and fixed blades of a lawn mower.

Other objects and advantages of my invention will become more apparent as the following description of an embodiment thereof progresses, reference being made to the accompanying drawings, in which like reference characters are employed to designate like parts throughout the same.

Figure 1 is a perspective view of a device embodying my invention and shows a file clamped in the holder ready for use.

Figure 2 is a perspective view of the holder plate or body, with the reversible clamp removed.

Figure 3 is a perspective view of the reversible clamp and guide member.

Figure 4 is a vertical section through a lawn mower inverted and shows the file and holder applied for simultaneously sharpening one of the rotary blades and cutter bar.

Figure 5 is a fragmentary view showing the device as applied on the tie rod for sharpening one of the rotary blades.

Figure 6 is a perspective view of the device in use as indicated in Figure 5.

Figure 7 is a fragmentary perspective view of the device in use for sharpening the cutter bar and a rotating blade simultaneously. This view shows the device as used in Figure 4.

Figure 8 shows how the guide may be reversed on the holder to prevent sharpening of the cutter bar while the device is used to sharpen one of the rotary blades.

In carrying out my invention as applied to the embodiment illustrated in the drawings, I provide a holder comprising a body 1 of sheet metal which may be stamped to shape and formed by dies as illustrated. The body is elongated and intermediate its ends is formed a channel 2 extending obliquely of the longitudinal axis of the body. The channel 2 is die formed and is substantially of inverted U shape, that is, it projects upwardly from the upper surface of the body as at 3 and is closed at the top, the bottom opening to slidably receive the mower blade therein. Of course, the angle of the channel with respect to the axis of the body is approximately that of the revolving blades of the mower which are intended to slide through the channel and in contact with the file 4. The file is supported upon the upper surface of the holder and is slidable through the slots 5 in the channel, but the under surface of the file does not project below the open bottom thereof.

The file is further held in proper alignment by means of the upstanding lugs 8 formed on the body 1 at one of its ends. These lugs engage the sides of the file as illustrated.

I have provided removable means for clamping the file in proper position and for properly guiding and aligning the cutter bar 40 of the mower when it is to be sharpened. This means preferably includes a removable and reversible guide 9 having a top portion 10 through which is threaded a locking screw 11. The screw operates through the plate 10 to engage and clamp the file tightly against the body 1. One edge 12 of the guide member 9 is upturned at an angle of about 45° and extends transversely of the file to receive and guide the cutter bar 40 of the mower as illustrated in Figure 4. In this manner it will be seen that the cutter bar 40 and one of the rotating blades 7 may be brought into contact simultaneously with opposite faces of the file 4 and that by reciprocating the file and holder 1 laterally both blade and cutter bar edges will be sharpened at once. Of course, in this connection it will be necessary first to loosen the cutter bar and to apply the sharpener to the mower after the latter has been turned over as illustrated in Figures 4 and 7. The opposite or rear edge of the guide is severed and the severed portions bent to form upstanding guide lugs 13 and a flat portion 14 intermediate the lugs remaining in substantially the same plane as the plate 10, the portion 14 serving as a shield as will be described presently.

The side portions of the guide 9 are bent downwardly to slidably engage opposite sides of the body 1, and are further formed with depending portions or guides 15 separated by an opening 16 to receive the tie rod 17 of the mower upon which the device rests as shown in Figures 5 and 6. The intermediate portions 18 are folded under the plate 10.

In one use of the device the cutter bar is loosened and the mower is turned over upon its back as illustrated in Figures 4, 7 and 8 so as to permit the reel that carries the blades to rotate freely. The device is then placed so that one of the blades 7 operates in the channel 2 and against a face of the file 4. With the proper lengthwise adjustment of the member 9 to receive the cutter bar bevelled edge, the screw 11 is tightened against the file and the body 1 of the sharpener.

The operator then grasps the ends of the file and reciprocates the device evenly from side to side and in firm engagement with the edge of the blade 7 and cutter bar 40. This is shown particularly in Figures 4 and 7. Due to the abrasive action of the faces of the file against the blade and cutter bar edges continued reciprocation of the device will cause these members to be sharpened. Each of the rotating blades may be sharpened in a similar manner.

When it is desired to sharpen the rotating blades 7 independently the device may be applied as shown in Figure 6, the tie rod 17 serving as a support and guide for the device. It will be noted that the tie rod passes transversely of the holder 1.

When it is desired not to sharpen the cutter bar 40 as illustrated in Figure 8, the member 9 is assembled on the holder as shown so that the flat portion 14 will support the bar as shown, thus protecting the cutting edges of the bar from the face of the file. This is particularly desirable where the cutting edge of the bar 40 is squared, since this type of blade cannot be sharpened simultaneously with the rotating blade in the particular embodiment illustrated. However, such blade may be sharpened independently if desired.

When the cutting edge of the bar is disposed at an angle less than 90° to the plane of the cutter bar, the member 9 is removed from the device and reversed to the position shown in Figure 4. When in such position the screw 11 is tightened as before and the cutting edge of the cutter bar 40 is placed against the guide 12. The device is then reciprocated with the abrasive surface of the file engaging the cutting edge.

It will be seen that I have provided a simple, inexpensive device which is particularly adapted for the purposes intended and that it is readily adjustable for use in connection with mowers of various sizes and makes, and that it is particularly useful and desirable because of its ability to sharpen both the cutter bar and rotating blades simultaneously if desired.

Various changes in the details of construction and arrangement of parts may be made without departing from the spirit of my invention or the scope of the appended claims.

I claim:

1. A device of the class described comprising a holder formed of a strip of metal and having a portion intermediate its ends upset out of the plane of the holder to receive a blade to be sharpened, a sharpening tool supported on said holder and lying in a plane intersecting said upset portion, a reversible clamp slidable along said holder to clamp the tool thereon in an adjusted position, said clamp having portions depending therefrom for guiding the holder on a support, and having other portions extending from its ends above said strip for guiding a stationary blade to be sharpened.

2. In a lawn mower blade sharpener, a holder formed of a strip of metal and having a portion intermediate its ends upset out of the plane of the holder and apertured to receive a sharpening tool lying substantially parallel to said strip, said upset portion providing a recess for receiving and guiding one of the rotatable blades of the mower therethrough when the holder is reciprocated transversely, a clamp slidable along said holder to clamp a sharpening tool thereon in an adjusted position, said clamp having portions depending therefrom and extending below the holder for guiding the holder on a support during reciprocation of the holder in sharpening said rotatable blade, and having other portions extending from its ends above said strip for simultaneously guiding a stationary blade to be sharpened.

PETER G. NELSON.